US010926273B2

(12) United States Patent
Schmalenberg et al.

(10) Patent No.: US 10,926,273 B2
(45) Date of Patent: Feb. 23, 2021

(54) SYSTEMS AND METHODS FOR MODIFYING AN INFRARED SIGNATURE OF A VEHICLE

(71) Applicant: Toyota Motor Engineering & Manufacturing North America, Inc., Plano, TX (US)

(72) Inventors: Paul Schmalenberg, Ann Arbor, MI (US); Ercan M. Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 129 days.

(21) Appl. No.: 16/264,210

(22) Filed: Jan. 31, 2019

(65) Prior Publication Data

US 2020/0246812 A1    Aug. 6, 2020

(51) Int. Cl.
*G01S 17/88* (2006.01)
*B05B 1/24* (2006.01)
*F41H 3/00* (2006.01)

(52) U.S. Cl.
CPC ............ *B05B 1/24* (2013.01); *G01S 17/88* (2013.01); *F41H 3/00* (2013.01)

(58) Field of Classification Search
CPC .......... G01S 17/86; G01S 17/89; G01S 17/10; G01S 17/931; G01S 7/4817; G01S 7/487; G01S 17/58; G01S 17/87; G01S 17/88; G01S 17/894; G01S 17/933; G01S 3/7867; G01S 7/003; G01S 7/4813; G01S 7/4814; G01S 7/4816; G01S 7/495; G01S 17/06; H01S 5/0215; H01S 5/0217; H01S 5/02212; H01S 5/02284; H01S 5/02469; H01S 5/34333; H01S 5/0085; H01S 5/02248; H01S 5/02268; H01S 5/02276; H01S 5/02292; H01S 5/0287; H01S 5/22; H01S 5/4012; B05B 1/24; F41H 3/00; F41H 9/06; G06T 2207/10028; G06T 7/11; G06T 19/006; G06T 19/20; G06T 7/292; G06T 7/70; G06T 13/40; G06T 15/20; G06T 17/00; G06T 17/05; G06T 17/20; G06T 2200/08; G06T 2200/16; G06T 2219/2012;

(Continued)

(56) References Cited

U.S. PATENT DOCUMENTS 4,406,815 A    9/1983    Magnusson et al.
4,522,126 A    6/1985    Bell
(Continued)

FOREIGN PATENT DOCUMENTS

RU    2006 124 136 A    1/2008
RU    2 609 816 C1    2/2017

*Primary Examiner* — Irakli Kiknadze
(74) *Attorney, Agent, or Firm* — Dinsmore & Shohl LLP

(57) ABSTRACT

Systems and methods for modifying an infrared signature of a vehicle are provided. A method may include producing an aerosol cloud proximate the vehicle. The method may further include determining one or more characteristics of the aerosol cloud. The method may also include determining a projection plane within the aerosol cloud based on the aerosol cloud characteristics for projecting a representation of the object. The method may additionally include providing heat at particles in the projection plane of the aerosol cloud to generate the object representation.

20 Claims, 11 Drawing Sheets

(58) Field of Classification Search
CPC .......... G06T 7/246; G06T 7/73; G06T 15/08;
G06T 15/205; G06T 2207/10016; G06T
2207/20076; G06T 7/004; G06T 7/0081;
G06T 11/40; G06T 2207/10012; G06T
2207/20012; G06T 2207/30244; G06T
2207/30252; G06T 7/248; G06T 7/285;
G06T 7/97; G01H 1/00; G06N 20/00;
G06N 3/0454; G06N 3/063; G06N 3/08;
G01V 3/40; G01V 7/00; G01V 7/06;
B60Q 1/2611; B60R 11/04; B60R
2300/50; B60R 2300/8073; B60R 25/302;
B60R 25/32; G03B 17/02; G03B
2215/0567; G03B 2217/002; G03B 29/00;
G06F 16/22; G06F 16/51; G06K 9/00228;
G06K 9/00791; G06K 9/325; G06K
9/00785; G06K 9/00798; G06K 9/00805;
G06K 9/00825; G08G 1/04; G08G 1/054;
G08G 1/202; G08G 1/0129; G08G
1/0175; G08G 1/052; G08G 1/162; G05D
1/0088; G05D 2201/0213; G05D 1/0257;
G05D 1/0055; G05D 1/0214; G05D
1/024; G05D 1/0246; G05D 1/0285;
G05D 1/0287; G05D 1/0223; G05D
1/0231; G05D 1/0248; G05D 1/0278;
G05D 1/0291

USPC ...................................................... 250/341.1
See application file for complete search history.

(56) References Cited

U.S. PATENT DOCUMENTS

| 6,402,045 | B1 | 6/2002 | Persson | |
| 6,484,640 | B1* | 11/2002 | Schneider | F41H 9/06 |
| | | | | 102/334 |
| 9,041,915 | B2* | 5/2015 | Earhart | G01S 7/4813 |
| | | | | 356/4.01 |
| 10,222,474 | B1* | 3/2019 | Raring | H01S 5/02212 |
| 2006/0060103 | A1 | 3/2006 | Koch et al. | |
| 2010/0328644 | A1* | 12/2010 | Lu | G01S 17/86 |
| | | | | 356/5.01 |
| 2011/0313722 | A1* | 12/2011 | Zhu | G01S 17/933 |
| | | | | 702/159 |
| 2016/0259038 | A1* | 9/2016 | Retterath | G01S 7/4815 |
| 2018/0143324 | A1* | 5/2018 | Keilaf | G01S 17/42 |
| 2019/0027048 | A1* | 1/2019 | Smith | G01S 17/933 |
| 2020/0019160 | A1* | 1/2020 | McArthur | G01S 7/52004 |
| 2020/0027363 | A1* | 1/2020 | Vana | B64D 43/00 |

* cited by examiner

```
                                      700
                                       ↙

702 ─┐  PRODUCE AN AEROSOL CLOUD AROUND OR WITHIN
                  A THRESHOLD DISTANCE OF THE VEHICLE ◄─────┐
                              │                              │
                              ▼                              │
                  704 ┐                                      │
                        AEROSOL                   SEARCH FOR
                   CLOUD CHARACTERISTICS           ANOTHER      ─706
                SATISFY A QUALITATIVE THRESHOLD TO AEROSOL CLOUD
                CREATE A HEAT REPRESENTATION OF  NO
                   THE VEHICLE WITHIN THE
                       AEROSOL CLOUD?
                              │
                             YES
                              ▼
          708 ─┐  DETERMINE A PROJECTION PLANE WITHIN THE AEROSOL
                  CLOUD BASED ON THE AEROSOL CLOUD CHARACTERISTICS
                  FOR PROJECTING A REPRESENTATION OF THE OBJECT
                              │
                              ▼
          710 ─┐  HEAT OR DIRECTLY LASE PARTICLES IN THE AEROSOL
                  CLOUD TO GENERATE THE VEHICLE REPRESENTATION
```

FIG. 7

```
                    ┌─────────────────────────────┐
              ┌────▶│ 802 CREATE/MAINTAIN HEAT    │
              │     │ SIGNATURE IN CURRENT        │
              │     │ AEROSOL CLOUD               │
              │     └──────────────┬──────────────┘
              │                    ▼
              │              ╱ 804       ╲
              │            ╱  ANOTHER     ╲    NO
              │           ╱ HEAT SIGNATURE ╲──────┐
              │           ╲   DESIRED IN   ╱      │
              │            ╲ ANOTHER      ╱       │
              │             ╲ AEROSOL    ╱        │
              │              ╲ CLOUD?   ╱         │
              │                  │ YES            │
              │                  ▼                │
              │            ╱ 806      ╲                 ┌──────────────────────┐
              │          ╱ ADDITIONAL  ╲                │ 812 USE ADDITIONAL   │
              │         ╱ LASER PROJ.   ╲   YES         │ LASER PROJECTOR TO   │
              │         ╲ WITH SUITABLE ╱──────────────▶│ CREATE THE OTHER HEAT│
              │          ╲ VANTAGE PT. ╱                │ SIGNATURE IN THE     │
              │           ╲ OF ADD'L  ╱                 │ ADDITIONAL AEROSOL   │
              │            ╲ CLOUD?  ╱                  │ CLOUD                │
              │                │ NO                     └──────────────────────┘
              │                ▼
              │          ╱ 808       ╲
              │        ╱  CURRENT     ╲
              │       ╱ LASER PROJ.   ╲
              │   NO  ╲ HAS BANDWIDTH ╱
              ├───────╱ AND SUITABLE  ╲
              │       ╲ VANTAGE PT.   ╱
              │        ╲ OF ADD'L    ╱
              │         ╲ CLOUD?    ╱
              │              │ YES
              │              ▼
              │     ┌─────────────────────────────┐
              │     │ 810 CURRENT LASER PROJECTOR │
              │     │ USES TIME DIVISION TO CREATE│
              └─────┤ OTHER HEAT SIGNATURE IN THE │
                    │ ADDITIONAL AEROSOL CLOUD    │
                    │ WHILE MAINTAINING CURRENT   │
                    │ HEAT SIGNATURE IN CURRENT   │
                    │ AEROSOL CLOUD               │
                    └─────────────────────────────┘
```

SYSTEMS AND METHODS FOR MODIFYING AN INFRARED SIGNATURE OF A VEHICLE

TECHNICAL FIELD

Embodiments described herein generally relate to projection systems and, more particularly, to systems and methods for modifying a vehicle's infrared signature.

BACKGROUND

When a vehicle is operated, parts of it emit heat as radiation having characteristic wavelengths in the infrared (IR) range. The operator may at times want to modify infrared signature of a vehicle for various reasons. For example, an operator may wish to shift a perceived location of the vehicle, or make the vehicle more visible to others or other vehicle systems.

SUMMARY

In one embodiment, a system for modifying an infrared signature of a vehicle may comprise a detection device configured to determine one or more characteristics of an aerosol cloud. The detection device may be further configured to determine a projection plane within the aerosol cloud based on the aerosol cloud characteristics for projecting a representation of the object. The system may further comprise an output device configured to provide heat at particles in the aerosol cloud to generate the object representation.

In another embodiment, a method may comprise producing an aerosol cloud proximate the vehicle. The method may further comprise determining one or more characteristics of the aerosol cloud. The method may also comprise determining a projection plane within the aerosol cloud based on the aerosol cloud characteristics for projecting a representation of the object. The method may additionally comprise providing heat at particles in the projection plane of the aerosol cloud to generate the object representation.

In yet another embodiment, a system for modifying an infrared signature of a vehicle may comprise an aerosol device configured for onboard use on the vehicle to produce an aerosol cloud. The system may also comprise a Flash LiDAR device with single photon counting capability configured to determine that the particle size, depth, and particle density of the aerosol cloud satisfies a qualitative threshold for creating a representation of an object. The Flash LiDAR device may be further configured to determine a projection plane within the aerosol cloud for projecting a representation of the object. The system may additionally comprise a laser device configured to generate a laser to provide heat at particles in the aerosol cloud to generate one or more heat signatures corresponding to one or more heat signatures associated with a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 is a flow chart depicting an exemplary process of utilizing a laser to heat aerosol cloud particles within a projection plane according to one or more embodiments described and illustrated herein; and FIG. 8 is a flow chart depicting an exemplary process of recreating a vehicle heat signature in multiple aerosol clouds according to one or more embodiments described and illustrated herein.

DETAILED DESCRIPTION

Vehicles typically have components that become heat sources during use, such that they may create a radiation heat signature by which they can be tracked by observers and systems utilizing heat-sensitive vision techniques such as infrared scanning. In some embodiments, a heat signature can be reproduced as a type of object representation laser-generated within an aerosol cloud. Some vehicle components typically generate higher amounts heat, where such heat sources can make the vehicle identifiable (including uniquely identifiable), trackable, and distinguishable from other vehicles, whose own heat signatures may their own spacings, shapes, and/or temperatures. For example, some vehicles have an internal combustion engine that generates significant heat, but nearly all vehicles have brakes, which generate appreciable heat.

A vehicle's heat signature may be utilized when visual tracking is limited, such as at night or during ambient conditions such as fog, rain, dust clouds, and the like. Additionally, a heat signature is even more distinctive in outdoor environments in colder weather, such that the heat signature becomes more prominent in relation to the lower heat values of surrounding objects, ground, and air. In addition, the vehicle's head signature and/or other representations of objects (such as a visual self-representation of the vehicle) can be recreated in other aerosols to aid a following vehicle. For example, the vehicle's projected heat signature may be projected to its rear and thus provider a closer indicator of the vehicle to the following vehicle, making the vehicle easier to follow.

Embodiments of the present disclosure are directed to systems and methods for modifying an infrared signature of a vehicle. In the disclosure, the phrase "infrared signature" is used synonymously with "heat signature". Embodiments modify a vehicle's heat signature by utilizing lasers to heat airborne particles in an aerosol that surrounds the vehicle. This advantageously makes it more difficult to track and/or identify the vehicle via its heat signature, as additional points of heat are added to the aerosol. Additionally, the vehicle can take advantage of other aerosols in the area, which may be created by the vehicle or otherwise exist in the environment. The vehicle can use lasers to heat up particles in these other aerosols to recreate its heat signature, thus also producing a heat signature in these aerosols that the vehicle does not occupy. This provides the advantage of creating an illusion of multiple instances of the vehicle's heat signature, thus making it more difficult to track the vehicle's location on the basis of its heat signature and to determine the vehicle's actual location. Another benefit of both these techniques is that neither appreciably increases the heat either inside or on the surface of the vehicle, and neither utilizes anything external to the vehicle other than aerosols.

Figure 1A:
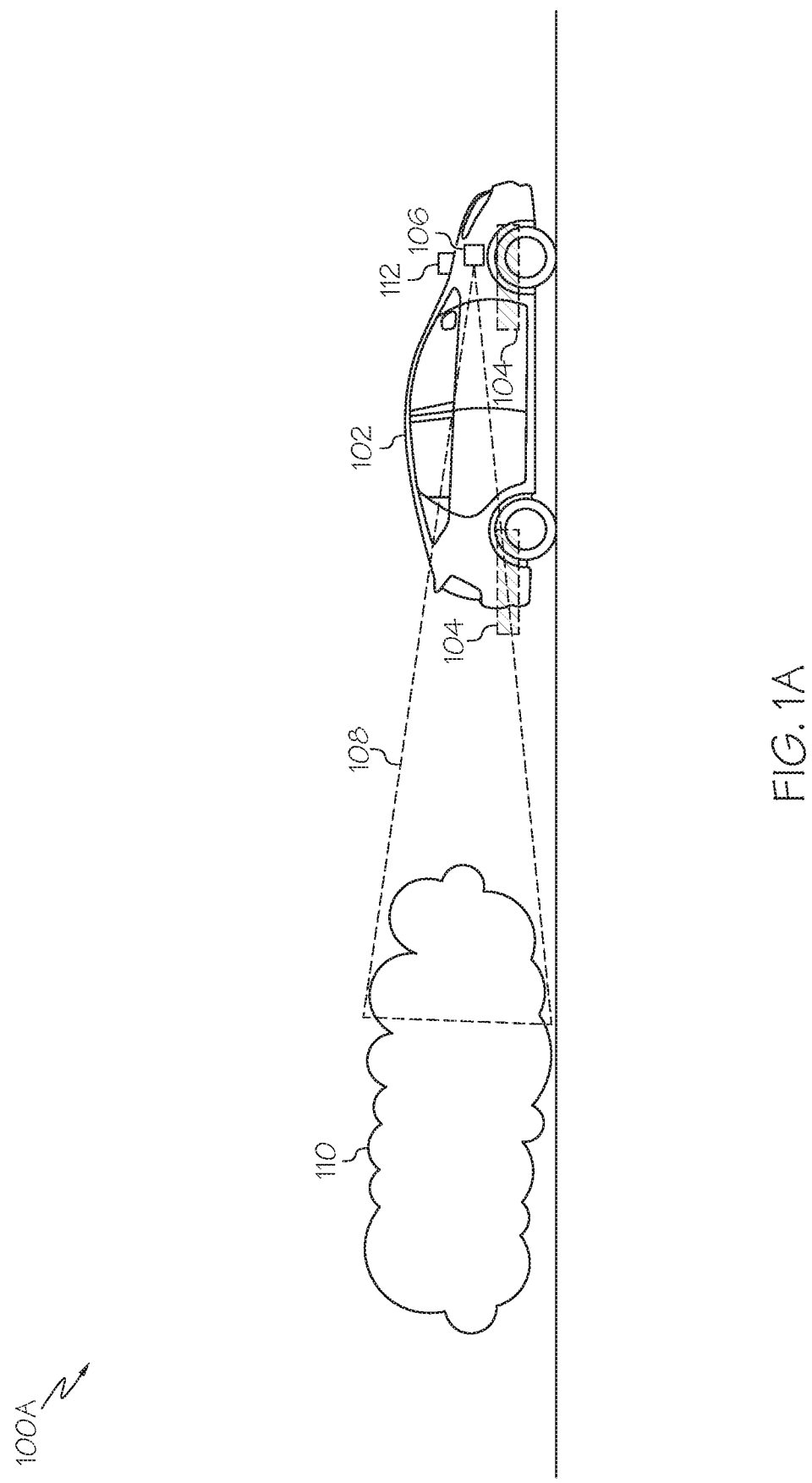
FIG. 1A schematically depicts a side view of a vehicle scanning a rear aerosol cloud according to one or more embodiments described and illustrated herein.

Referring now to FIG. 1A, a diagram 100A of a vehicle 102 scanning a rear aerosol cloud 110 is depicted. A vehicle 102 may include anything capable of transporting one or more passengers, including but not limited to cars, trucks, motorcycles, bicycles or any other type of passenger-powered vehicles, aircraft, and watercraft. A vehicle 102 may be navigated by an operator, such as a driver, pilot, captain, etc. In other embodiments, the vehicle may be partially autonomous, for example where the vehicle completes some tasks for the driver, such as parking or keeping the vehicle in a lane. In still other embodiments, the vehicle may be autonomous, for example where the vehicle operates with little or no input (such as providing destination information, route preferences, and/or infrared modification options as discussed in more detail below) from any occupant. In some embodiments the vehicle 102 may be autonomous and drive without any occupants and/or drivers.

The vehicle 102 has multiple heat sources that create a heat signature 104 by emitting infrared radiation as heat. For example, the vehicle's brakes create a heat signature 104, as they emit more heat the more frequently they are used. In this embodiment, a passenger-side front brake and a passenger-side back brake are depicted due to the side view, the vehicle 102 in other embodiments may utilize any suitable brake configurations (four brakes, two front brakes, two rear brakes, and the like). Other vehicle components such as an internal combustion engine and automatic components (auto-open/close doors, windows, sunroofs, convertible roofs, etc.) may generate their own heat and contribute to a heat signature 104 of the vehicle 102. A heat signature 104 may allow the vehicle 102 to be tracked, even when conditions otherwise reduce or remove the vehicle's appearance in visible light to an observer (such as when the vehicle 102 is engulfed in an aerosol cloud of sand or fog).

In the example of FIG. 1A, the vehicle 102 travels along a dusty surface (e.g., an unpaved/dirt road, a paved road covered in a dusty substance, or the like) such that an aerosol cloud 110 is kicked up behind the vehicle as its tires disturb the dusty surface (such as creating a cloud of dirt). An aerosol 110 may be any particulate suspended in air (e.g., dust, sand/dirt, fog, liquid vapor/droplets, rain, snow, sleet, ash, and the like), and may exist independent of whether the vehicle 102 is still, in motion, or even regardless of the vehicle's presence. Other causes of aerosol cloud 110 formation may include weather and/or other environment phenomena (fire, volcanic activity, man-made causes such as explosions, and the like).

The vehicle 102 may utilize a scanning device 106 to generate a scan 108 of an aerosol cloud 110. A scanning device 106 may be located in any suitable location on the vehicle 102. Any suitable number of scanning devices device 106 may be utilized on the vehicle 102, where not all scanning devices 106 on the vehicle 102 need be the same. In the illustrated embodiment, the scanning device 106 is a Flash LiDAR device with single photon counting capability to build a 3D data set of the shape and density of the aerosol cloud, although any suitable scanning device may be utilized, such as laser, radar, and the like. The scanning device 106 analyzes the aerosol cloud 110 for aerosol cloud parameters such as particle size, depth, particle density, and the like. The scanning device 106 then compares the particle size, depth, and particle density of the aerosol cloud for creating modified heat signatures and verifies that these values will support a projection plane. In this embodiment, the Flash LiDAR then builds a depth map of the aerosol cloud density to determine the projection plane for modified infrared signatures (i.e., object representations) and also to calibrate a projection-scan process. As discussed further in more detail below, this may be done prior to heating particles in the aerosol cloud 110, which establishes whether the aerosol cloud 110 can sufficiently support modifying a heat signature, such as heat signatures 104. If the particle density is not sufficient, more photon counting pulses may be utilized and sent into the aerosol cloud 110 until the measured particle density is sufficient for modified heat signatures and/or other object representations.

Figure 1B:
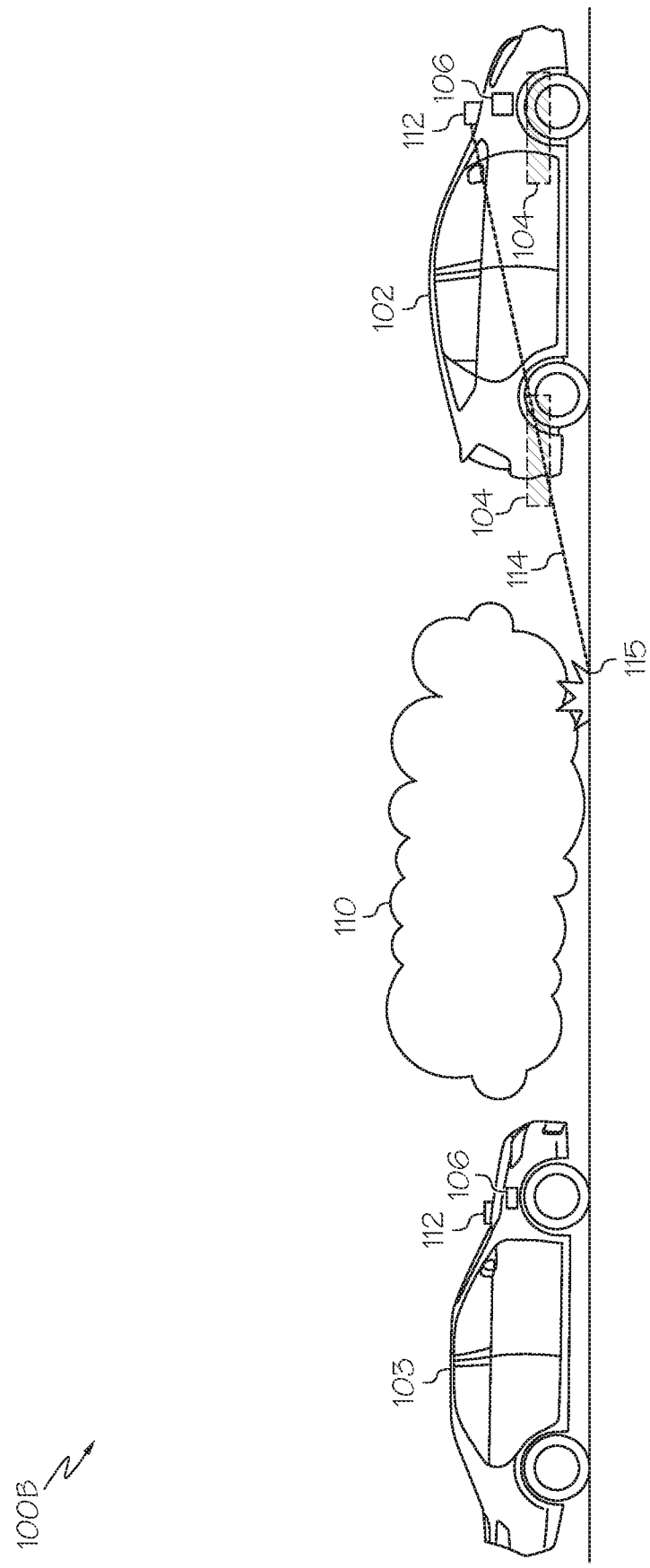
FIG. 1B schematically depicts a side view of a vehicle utilizing a laser incident to the ground to generate an aerosol cloud in front of a following vehicle according to one or more embodiments described and illustrated herein.

Turning to FIG. 1B, a diagram 100B depicts an embodiment showing a vehicle 102 utilizing a laser 114 incident to the ground to create an aerosol cloud 110 in front of a following vehicle 103. In the illustrated embodiment, the vehicle 102 uses a laser projector 112 (i.e., an output device) to emit a laser 114 incident to the ground at an aerosol generation target 115 in order to generate airborne particles and produce an aerosol cloud 110. Any suitable type of laser emitting device may be utilized as a laser projector 112. Although depicted on the ground, an aerosol generation target 115 may be located anywhere that a projector 112 can hit with a laser 114 to generate airborne particles to create an aerosol cloud, such as on a hill/mountain/embankment or other incline surface. In some embodiments, a scanning device 106 and a laser projector 112 may be within the same device. As discussed in more detail below, an object representation, such as a heat signature, can be generated in the aerosol cloud that is produced or naturally occurring. As a non-limiting example, vehicle 102 may enhance its heat signature to be more visible to vehicle 103. Moreover, this may allow vehicle 102 to provide a time/distance buffer with respect to the following vehicle 103, such that a greater following distance can be maintained for more reaction time when traveling above a threshold speed and/or when encountering reduced visibility. It is noted that the laser device that produces the aerosol cloud may be the same as, or different from, the laser device that creates the heat signature within the aerosol cloud.

In embodiments, a laser 114 may be utilized to create aerosol clouds in front, to the sides, or in any other suitable position relative to a vehicle 102. In various embodiments, the following vehicle 103 may have any of the characteristics and/or equipment discussed herein as applied to vehicle 102 as non-limiting examples. Lasers emitted incident to the ground to generate airborne particles and produce the aerosol cloud 110 may be pulsed lasers with high peak power. In some embodiments the aerosol 110 may be created by the laser 114 incident to the ground to obscure or diminish the visible view that the following vehicle 103 has of the vehicle 102

Figure 2A:
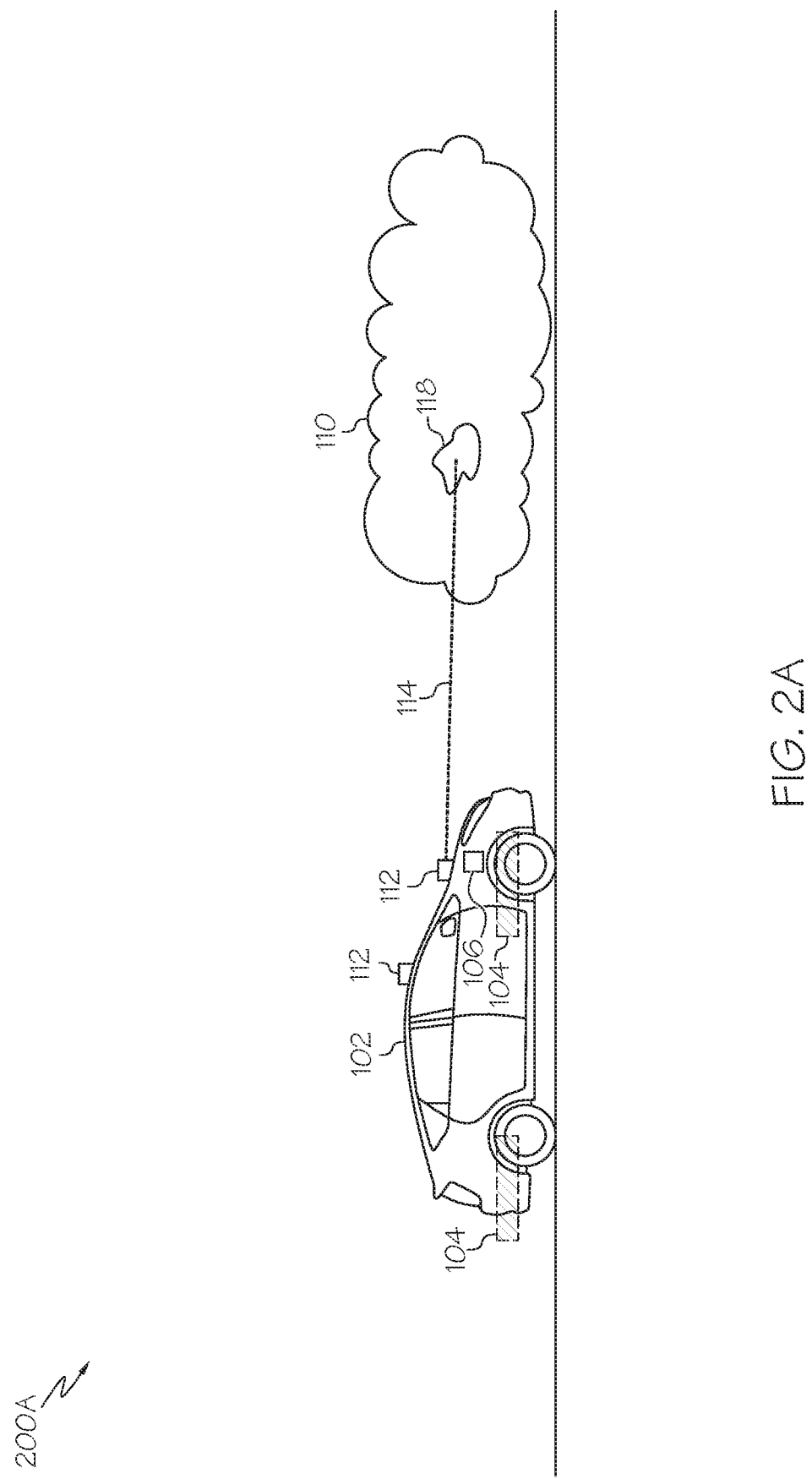
FIG. 2A schematically depicts a side view of a vehicle utilizing a laser to heat particles in an aerosol cloud according to one or more embodiments described and illustrated herein.

Turning to FIG. 2A, a diagram 200A depicts an embodiment showing a vehicle 102 utilizing a laser projector 112 to emit a laser 114 to heat particles in an aerosol cloud 110. In embodiments, the laser 114 heats particles to generate an object representation 118, which in this embodiment is a three dimensional image, although other embodiments may utilize flat, two-dimensional object representations. Lasers 114 heat or directly lase the aerosol cloud particles to create object representations 118 within an aerosol cloud 110. Lasers 114, as described herein to create heat signatures and other object representations 118 in aerosol clouds 110, may have characteristic micrometer (um) wavelengths in the mid (3 um-8 um) infrared range (IR) and/or long (8 um-15 um) IR range. In embodiments, lasers 114 may have a wavelength that physically heats the particles of the aerosol cloud 110. In other embodiments, lasers 114 have an IR wavelength corresponding to the heat signature of the desired object representation 118. In such embodiments, the heat signature is not generated by the physical heating of the particles, but rather the reflection of the IR laser beam off of the particles in the aerosol cloud 110. In this manner, the lasers 114 directly lase the aerosol cloud particles with an IR wavelength. Thus, the lasers 114 may raster project an image of the object representation directly onto the aerosol cloud using an IR wavelength corresponding to the object representation.

In embodiments, an object representation 118 may have shape characteristics (such as being elongated or rectangular) or may be a heat blob lacking a distinctive/predetermined shape, which may be utilized where an observer is anticipated but at an unknown location.

After an object representation 118 is projected onto an aerosol cloud 110, a calibration option may also be utilized to calibrate a projection-scan process by subsequently scanning the projected object representation 118 for accuracy. The calibration compares the predicted appearance object representation in the aerosol cloud 110, based upon the depth map and aerosol cloud parameters, with the actual object representation 118 via a scan by the scanning device 106 of the object representation 118, where any differences are recorded and applied by the laser projector 112 to create another object representation for another calibration scan, and so on, until any inconsistencies are eliminated or at least reduced.

Figure 2B:
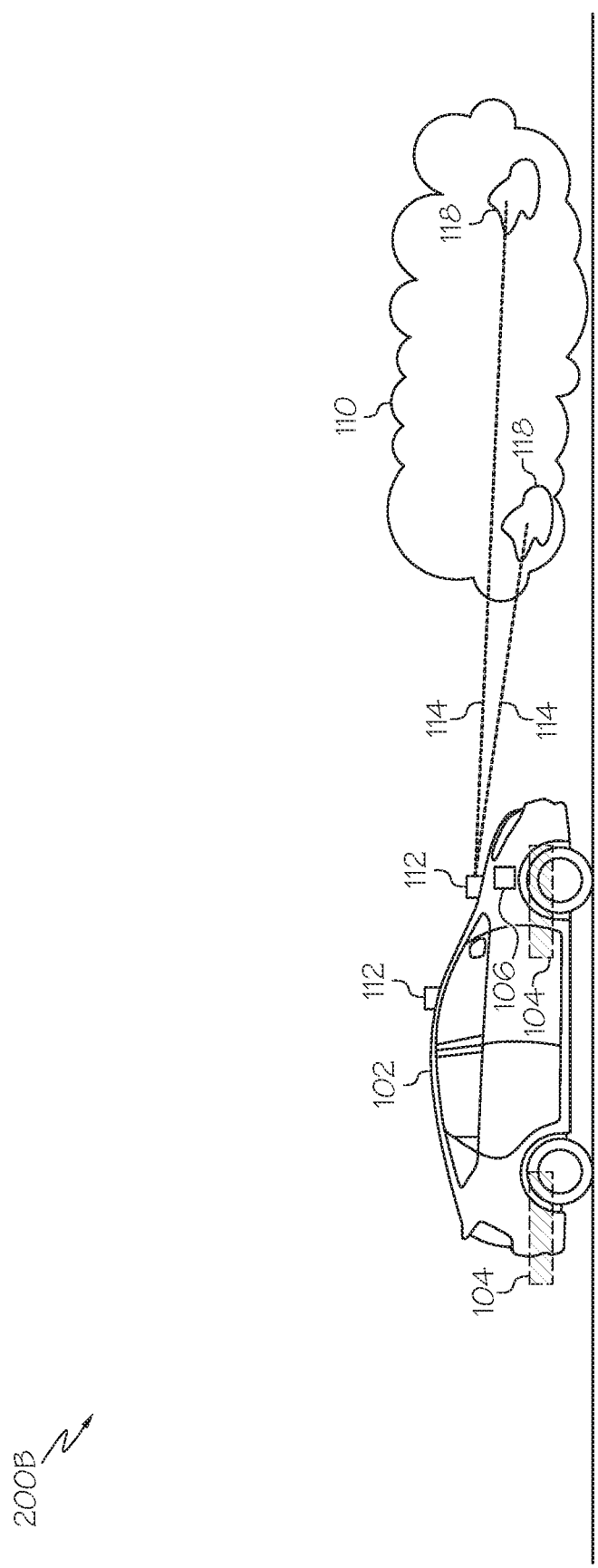
FIG. 2B schematically depicts a side view of a vehicle utilizing two lasers to heat particles in an aerosol cloud to generate an object representation according to one or more embodiments described and illustrated herein.

Turning now to FIG. 2B, a diagram 200B depicts an embodiment showing a vehicle 102 utilizing two laser projectors 112 to produce two lasers 114 to heat particles in an aerosol cloud 110. The two lasers 114 create two object representations 118 within an aerosol cloud 110, which in this example is a modified heat signature that matches or approximates the three dimensional heat signature 104 of the vehicle 102, which comprises two object representations 118 associated with the vehicle 102 (i.e., the brakes in this example).

Figure 3A:
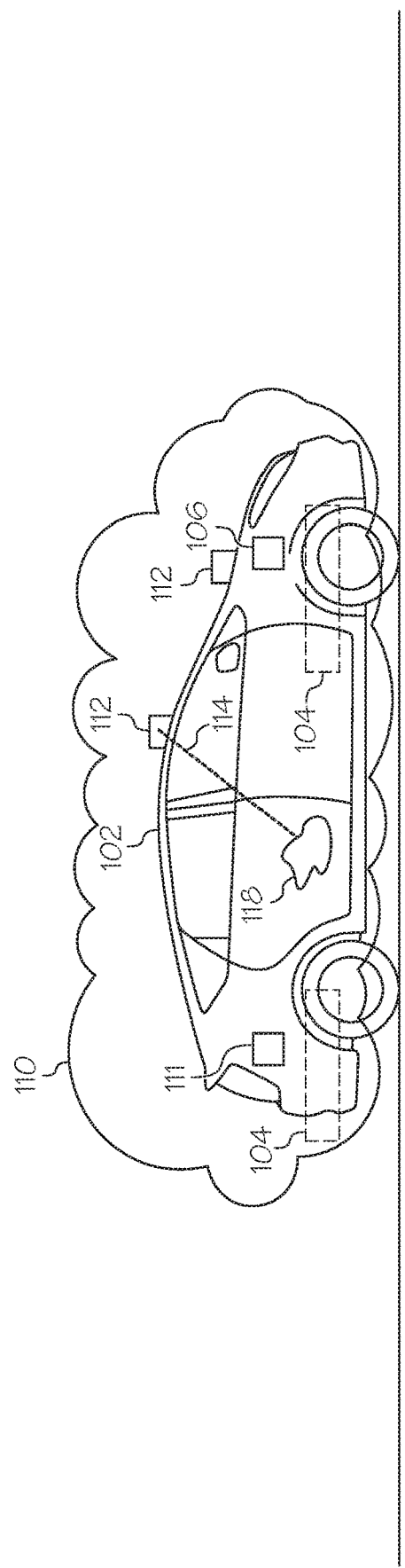
FIG. 3A schematically depicts a side view of a vehicle utilizing a laser to heat particles within a surrounding aerosol cloud emitted by an aerosol device on the vehicle according to one or more embodiments described and illustrated herein.

Referring to FIG. 3A, a diagram 300A depicts an embodiment showing a vehicle 102 utilizing a laser 114 to heat particles within an aerosol cloud 110 surrounding the vehicle 102. The aerosol cloud 110 has been emitted by an aerosol device 111 aboard the vehicle 102. Any suitable aerosol device 111 may be utilized, such as a fog machine, smoke-producing device, mister, or any other device capable of producing an aerosol. Any number of aerosol devices 111 may be utilized, where each aerosol device 111 may be different. An aerosol cloud 110 around the vehicle may be utilized for modifying the appearance of the location of the vehicle, such as creating a heat signature or other object representation 118 with a laser 114 (or multiple lasers). In this way, the object representation 118 may be used to distort, camouflage or otherwise modify the heat signature 104 of the vehicle 102.

Figure 3B:
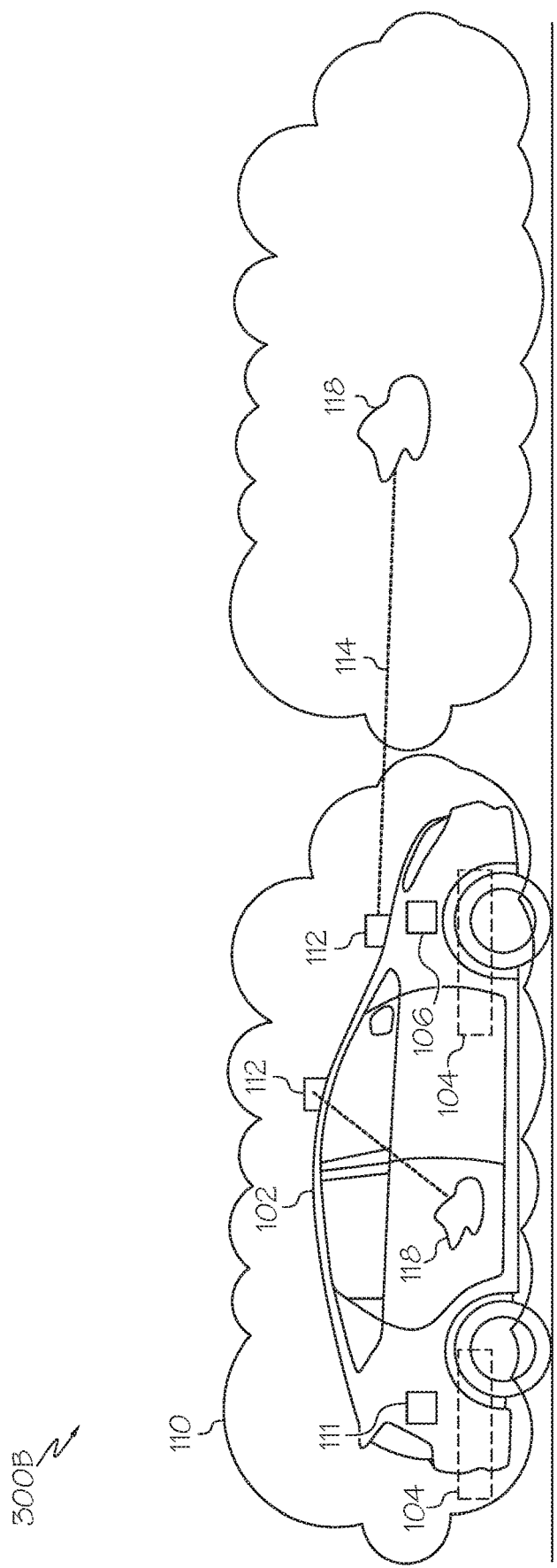
FIG. 3B schematically depicts a vehicle using multiple lasers to heat particles in multiple aerosol clouds according to one or more embodiments described and illustrated herein.

Referring now to FIG. 3B, a diagram 300B depicts an example showing a vehicle 102 utilizing two laser projectors 112, one emitting a laser 114 to heat particles within an aerosol cloud 110 surrounding the vehicle 102, and the other emitting a laser 114 to heat particles within an aerosol cloud 110 external to the vehicle 102. By utilizing multiple laser projectors 112, one laser projector 112 can target an aerosol cloud 110 to which the other laser projector 112 does not have a clear vantage point, such as where laser projectors 112 are located on opposite sides of the vehicle 102.

Figure 4:
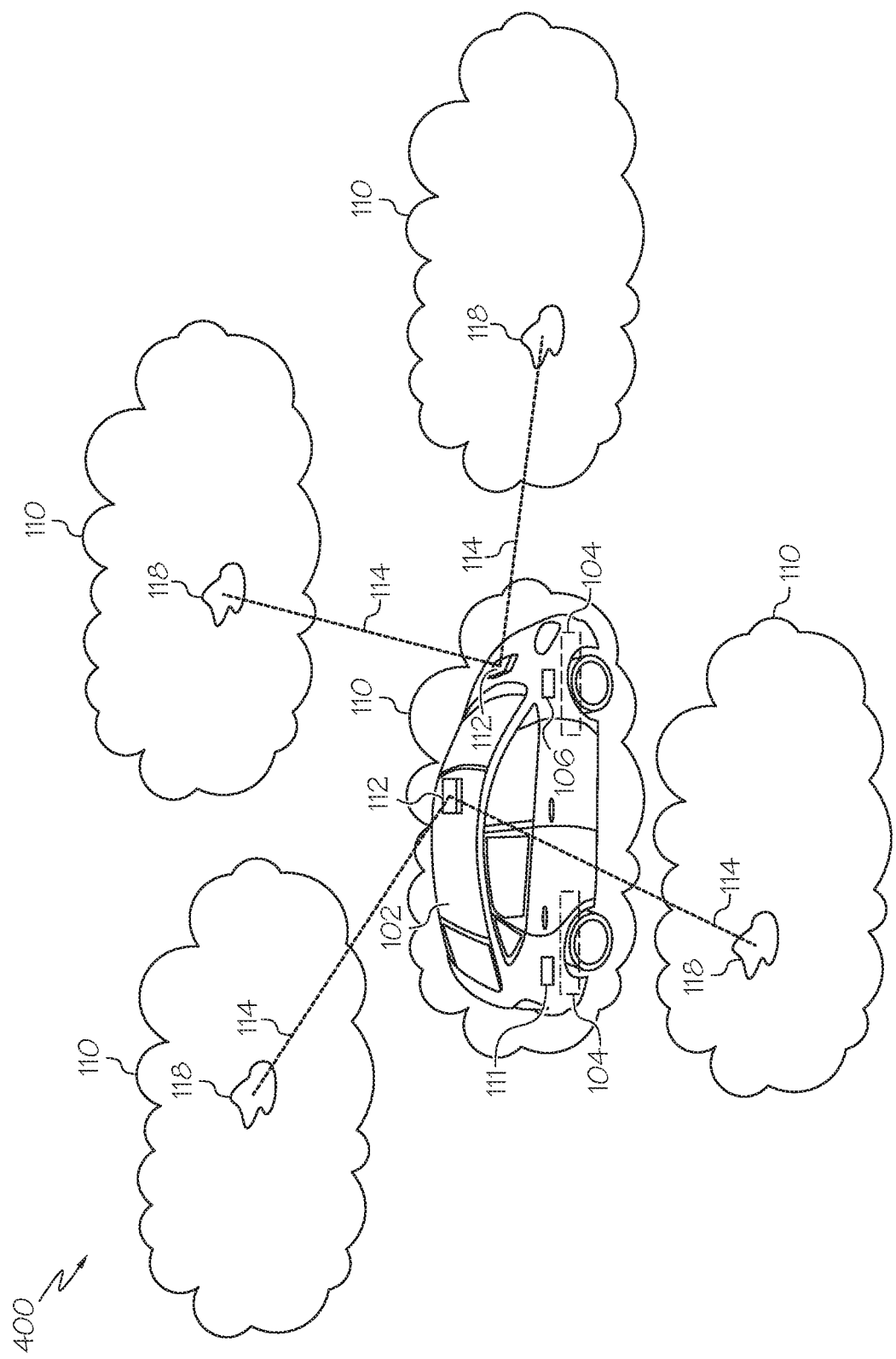
FIG. 4 schematically depicts a top perspective view of a vehicle utilizing two laser projectors each emitting two lasers to heat particles in multiple aerosol clouds through time division according to one or more embodiments described and illustrated herein.

Turning to FIG. 4, a diagram 400 depicts an example showing a vehicle 102 using two laser projectors 112 to emit a combined four lasers 114 to heat particles in four aerosol clouds 110 through time division. In this embodiment, the aerosol device 111 emits an aerosol cloud 110 around the vehicle 102 while two laser projectors 112 create four object representations 118, one in each aerosol cloud 110 near the vehicle 102. Any suitable technique, such as time division, may be utilized such that each laser projector 112 can create and/or maintain multiple object representations 118, depending on factors such as the power of the laser 114 and the consistency and/or composition of the particular aerosol cloud 110. Any suitable time division technique may be utilized, such as fixed-length time segments combined in a round-robin fashion, priority based multiplexing (based upon which object representation 118 currently needs a laser 114 the most), and the like.

Figure 5:
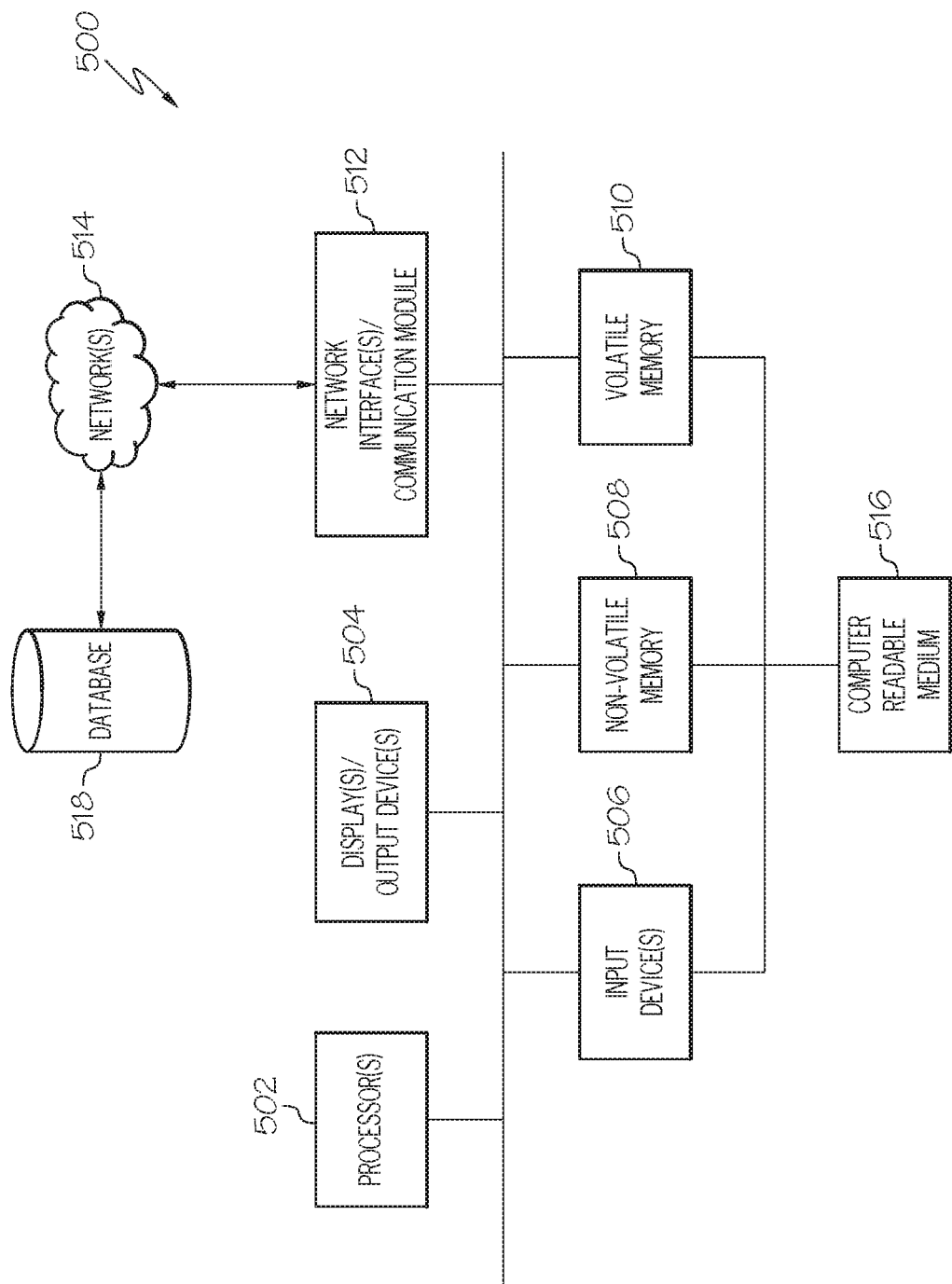
FIG. 5 is a block diagram illustrating computing hardware utilized in one or more devices for implementing various processes and systems, according one or more embodiments shown and described herein.

FIG. 5 illustrates a block diagram depicting an exemplary computing device 500, through which embodiments of the disclosure can be implemented. The computing device 500 described herein is but one example of a suitable computing device and does not suggest any limitation on the scope of any embodiments presented. Nothing illustrated or described with respect to the computing device 500 should be interpreted as being required or as creating any type of dependency with respect to any element or plurality of elements. In various embodiments, a computing device 500 may include, but need not be limited to, a desktop, laptop, server, client, tablet, smartphone, an on-board vehicle computer, or any other type of device that can compress data. In an embodiment, the computing device 500 includes at least one processor 502 and memory (non-volatile memory 508 and/or volatile memory 510). In some embodiments, the computing device 500 is a non-transitory computing device, in which the at least one processor is coupled to the memory (non-volatile memory 508 and/or volatile memory 510). A non-transitory computing device 500 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 500 can include one or more displays and/or output devices 504 such as monitors, speakers, headphones, projectors, wearable-displays, holographic displays, printers, the aerosol device 111 described herein, the scanning device 106 described herein, the laser projector 112 described herein, and/or the heat signature selection interface 600 described herein. Output devices 504 may output audio sounds, visuals, aerosols, and the like. The computing device 500 may further include one or more input devices 506 which can include, by way of example, any type of mouse, keyboard, disk/media drive, memory stick/thumbdrive, memory card, pen, touch-input device, biometric scanner, voice/auditory input device, motion-detector, camera, scale, the heat signature selection interface 600 described herein, and/or the scanning device 106 described herein.

The computing device 500 may include non-volatile memory 508 (ROM, flash memory, etc.), volatile memory 510 (RAM, etc.), or a combination thereof. A network interface 512 can facilitate communications over a network 514 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 512 can be communicatively coupled to any device capable of transmitting and/or receiving data via the network 514. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 516 may comprise a plurality of computer readable mediums, each of which may be either a computer readable storage medium or a computer readable signal medium. A computer readable storage medium 516 may reside, for example, within an input device 506, non-volatile memory 508, volatile memory 510, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 500 may include one or more network interfaces 512 to facilitate communication with one or more remote databases 518 to remotely access data and store data, such as heat signatures and other types of object representations for retrieval by vehicle operators as described herein. A network interface 512 may also be described as a communications module, as these terms may be used interchangeably.

Figure 6:
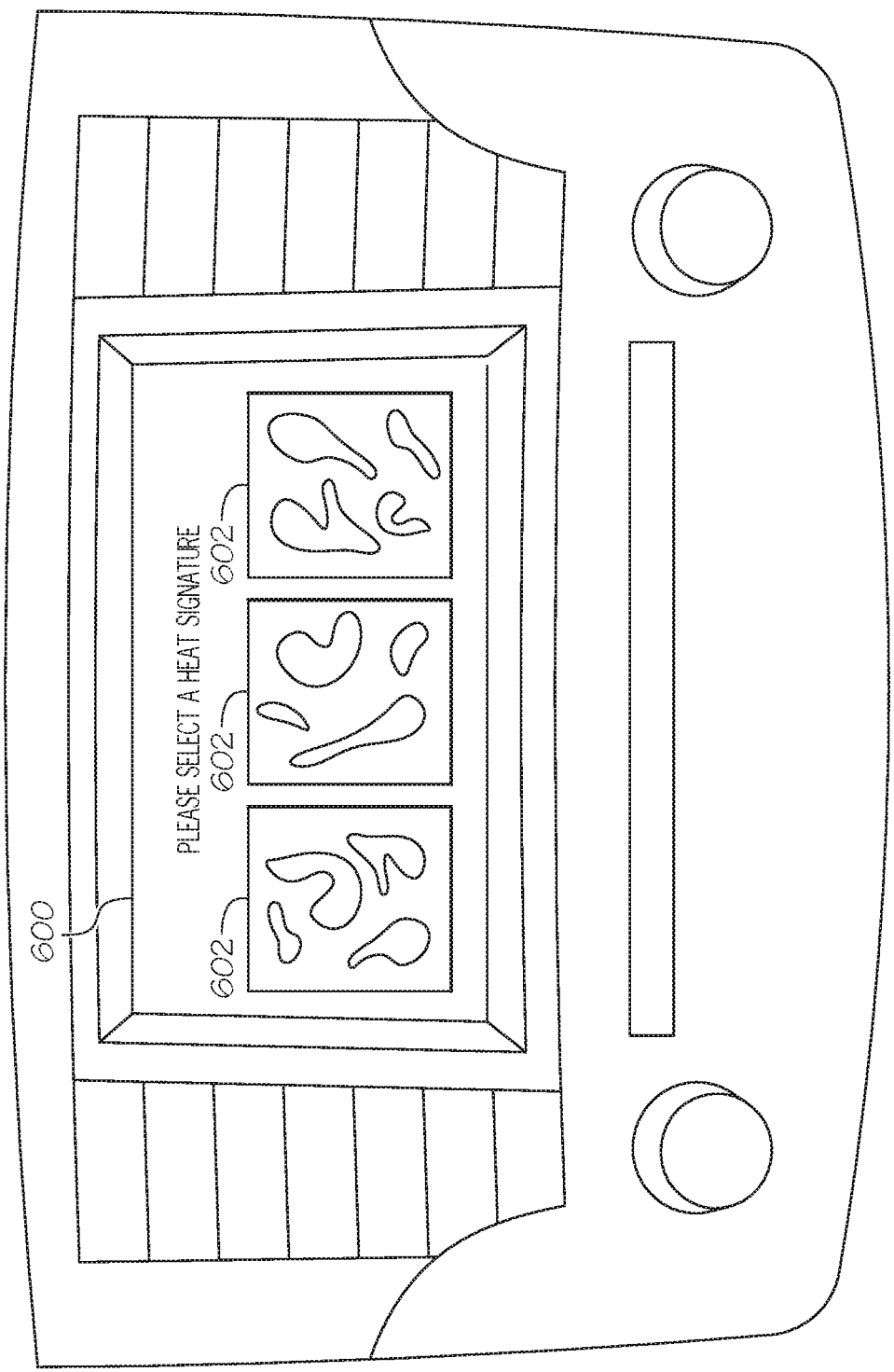
FIG. 6 schematically depicts an example interface for selecting a heat signature according to one or more embodiments described and illustrated herein.

Turning now to FIG. 6, a diagram illustrates an exemplary heat signature selection interface 600 for choosing among selectable object representations 602. The selectable heat signatures 602 may be used to modify the vehicle's heat signature or produce a new heat signature within an aerosol surrounding the vehicle and/or to produce a heat signature in another aerosol (such as replicating the vehicle's heat signature in another aerosol). The heat signatures may be stored in an-board database local to the vehicle and/or retrieved/downloaded from one or more remote databases (which may include a private/secure server and/or the Internet). In other embodiments, different types of laser-produced three-dimensional object representations may be presented, selected, and or utilized. In some embodiments, a database may include multiple pre-modeled heat signatures based upon characteristics of a vehicle comprising a distance between blobs relative to the same vehicle, heat intensity, size, and shape. The heat signature selection interface 600 may be presented within the vehicle (such as on a touchscreen or other computer hardware capable of human interaction) for the driver or another user to select a heat signature. In some embodiments, the interface may be operated by keyboard/keypad, joystick, voice, gaze-tracking, gestures, and the like. The heat signature selection interface 600 may be operated from within the vehicle, or outside of the vehicle by other users, such as from a remote location. The heat signature selection interface 600 may provide a user with options to create aerosol clouds (such as utilizing lasers incident to the ground and/or emitting an aerosol cloud via the aerosol device) and/or to select aerosol clouds as targets for generating heat signature by laser(s). Users may select particular aerosol clouds with the aid of in-vehicle and/or external cameras.

Turning now to FIG. 7, a flowchart 700 illustrates an exemplary process for utilizing a laser to heat aerosol cloud particles within a projection plane. At block 702, an aerosol cloud is generated around or within a threshold distance of the vehicle. This may be due to a laser from a laser projector being emitted incident to the ground, an aerosol being emitted from an aerosol device, or both. At block 704, a determination is made by a scanning device as to whether characteristics of an aerosol cloud satisfy a qualitative threshold (particle size, depth, and particle density) to create a heat representation of the vehicle on a projection plane within the aerosol cloud. If not, then at block 706 a search is conducted for another aerosol cloud. Otherwise, if the aerosol cloud characteristics satisfy a qualitative threshold, then at block 708 a projection plane within the aerosol cloud is determined based on the aerosol cloud characteristics for projecting a representation of the object. At block 710, particles in the aerosol cloud are heated or directly lased to generate the vehicle representation, such as a modified heat signature.

Referring to FIG. 8, a flowchart 800 illustrates an exemplary process for recreating a vehicle heat signature in multiple aerosol clouds, although other embodiments may utilize other types of object representations. At block 802, a heat signature is created and/or maintained in an aerosol cloud by a laser projector emitting a laser into an aerosol cloud. At block 804, a determination is made as to whether another heat signature is desired in another aerosol cloud. The determination may be made by a user in the vehicle (such as the driver) or automatically by the vehicle. If no additional heat signature is desired, then the flowchart returns to block 802 to maintain one or more current heat signatures. Otherwise, if an additional heat signature is desired, then at block 806 a determination is made as to whether there is an additional laser projector with a suitable vantage point of the additional aerosol cloud. If so, then at block 812 the additional laser project is used to create an additional heat signature in the in the additional aerosol cloud, and the flowchart terminates.

Otherwise, if the additional laser projector lacks a suitable vantage point of the additional aerosol cloud, then at block 808 a determination is made as to whether the current laser projector has available bandwidth and a suitable vantage point of the additional aerosol cloud. The bandwidth determination may be based, for example, on whether further subdividing the amount of time that the current laser projector can spend on each heat signature would still allow each heat signature to be adequately maintained, or if the current laser projector would be stretched too thin. If this would not be feasible with the current laser projector, then the flowchart returns back to block 802 in order to maintain the current heat signature in the current aerosol cloud, without creating a new heat signature in the additional aerosol cloud. Otherwise, at block 810, the current laser projector may use a time division to create the additional heat signature in the additional aerosol cloud by reducing the amount of time allocated to each heat signature, including maintaining the current heat signature in the current aerosol cloud with reduced time resources dedicated to it.

It should now be understood that embodiments described herein are directed to modifying a vehicle's heat signature or creating a different heat signature by heating aerosol cloud particles with lasers. Aerosols can be created by the vehicle's lasers by striking the ground, from an aerosol device, and naturally such as by weather or the motion of any vehicle over a surface such as a dusty road. The lasers can be used for heat signature modification or creation in an aerosol surrounding the vehicle to modify the vehicle's heat signature within the cloud and/or for heat signature modification or creation by heating particles in other aerosols to reproduce instances vehicle's heat signature. Embodiments can also be used to help another vehicle follow by producing the heat signature closer to the following vehicle to compensate for following vehicle not being able to see, or not see as well, the vehicle it is following.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for modifying an infrared signature of a vehicle comprising:
   a flash lidar detection device comprising a processor and non-transitory memory, the flash lidar detection device configured to:
      determine one or more characteristics of an aerosol cloud;
      determine a projection plane within the aerosol cloud based on the aerosol cloud characteristics for projecting a representation of an object; and
   a laser device comprising a processor and non-transitory memory, the laser device configured to provide heat at particles in the aerosol cloud to generate the object representation.

2. The system of claim 1, further comprising an aerosol device configured for onboard use on the vehicle to emit the aerosol cloud.

3. The system of claim 2, wherein the aerosol device is a laser-producing device further configured to produce a laser that is incident to a ground surface to generate airborne particles and produce the aerosol cloud.

4. The system of claim 2 further configured to produce a plurality of separate aerosol clouds at different locations around the vehicle via the aerosol device, one or more lasers, or a combination thereof.

5. The system of claim 1, wherein the flash lidar detection device is further configured to scan the aerosol cloud prior to heating particles in the aerosol cloud.

6. The system of claim 1, wherein:
   the aerosol cloud parameters comprise particle size, depth, and particle density; and
   the detection device comprises a flash lidar device with single photon counting capability to build a 3D data set of a shape and density of the aerosol cloud.

7. The system of claim 1, wherein a particle depth map calibrates a projection-scan process by subsequently scanning the projected object representation for accuracy.

8. The system of claim 1, wherein the laser device is configured emit a laser that heats particles in the aerosol cloud.

9. The system of claim 1, wherein the laser device is configured emit a laser having an infrared wavelength and to directly lase particles within the aerosol cloud such that the laser having the infrared wavelength is reflected off the particles in the aerosol cloud.

10. The system of claim 1 wherein the object representation is a heat blob that does not have a predetermined shape and is utilized for an observer at an unknown location.

11. The system of claim 10 communicatively coupled to a database that comprises a plurality of premodeled heat signatures based upon characteristics comprising a distance between blobs relative to the same vehicle, heat intensity, size, and shape.

12. The system of claim 1 wherein the output device is further configured to produce an enhanced thermal image for a second vehicle following the vehicle to provide a buffer for following above a threshold rate of speed.

13. The system of claim 1 wherein the object representation in the aerosol cloud is a three dimensional heat signature of a component of a vehicle.

14. The system of claim 13 wherein the vehicle representation in the aerosol cloud further comprises a plurality of object representations associated with one or more vehicles.

15. A method for modifying an infrared signature of a vehicle comprising:
producing an aerosol cloud proximate the vehicle;
determining, via a flash lidar detection device, one or more characteristics of the aerosol cloud;
determining a projection plane within the aerosol cloud based on the characteristics of the aerosol cloud for projecting a representation of an object; and
providing, via a laser device, heat at particles in the projection plane of the aerosol cloud to generate the object representation.

16. The method of claim 15 wherein the characteristics of the aerosol cloud comprise particle size, depth, and particle density.

17. The method of claim 15 further comprising:
scanning the aerosol cloud prior to heating; and
building a particle depth map based upon the aerosol cloud.

18. The method of claim 15 further comprising producing, via the laser device, a laser that is incident to a ground surface to generate airborne particles and produce the aerosol cloud.

19. The method of claim 15 wherein representation of the object in the aerosol cloud comprises a plurality of heat signatures corresponding to a plurality of heat signatures associated with one or more vehicles.

20. A system for modifying an infrared signature of a vehicle comprising:
an aerosol device configured for onboard use on the vehicle to produce an aerosol cloud;
a flash lidar detection device, comprising a processor and non-transitory memory, with single photon counting capability configured to:
determine that the particle size, depth, and particle density of the aerosol cloud satisfies a qualitative threshold for creating a representation of an object; and
determine a projection plane within the aerosol cloud for projecting a representation of the object; and
a laser device, comprising a processor and non-transitory memory, the laser device configured to generate a laser to provide heat at particles in the aerosol cloud to generate one or more heat signatures corresponding to one or more heat signatures associated with the vehicle.

* * * * *

UNITED STATES PATENT AND TRADEMARK OFFICE
CERTIFICATE OF CORRECTION

PATENT NO. : 10,926,273 B2
APPLICATION NO. : 16/264210
DATED : February 23, 2021
INVENTOR(S) : Paul Schmalenberg and Ercan M. Dede It is certified that error appears in the above-identified patent and that said Letters Patent is hereby corrected as shown below:

In the Claims

In Column 11, Line(s) 5, Claim 8, after "configured", insert --to--.

In Column 11, Line(s) 8, Claim 9, after "configured", insert --to--.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*